July 5, 1927.  L. P. LEWIS ET AL  1,635,089
MARKER
Filed March 4, 1925    2 Sheets-Sheet 1
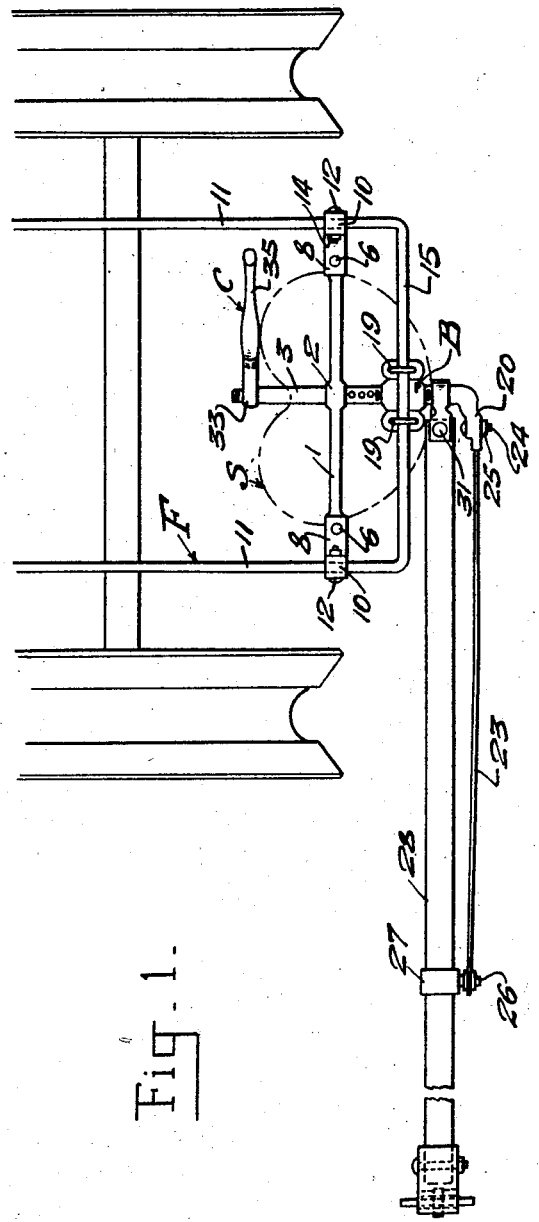
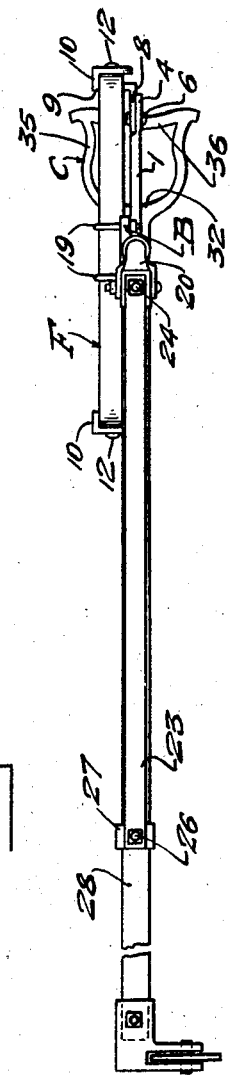
Fig.1.
Fig.2.
Inventor
L. P. Lewis
W. Morgenthaler
By Watson E. Coleman.
Attorney July 5, 1927.
L. P. LEWIS ET AL
1,635,089
MARKER
Filed March 4, 1926
2 Sheets-Sheet 2
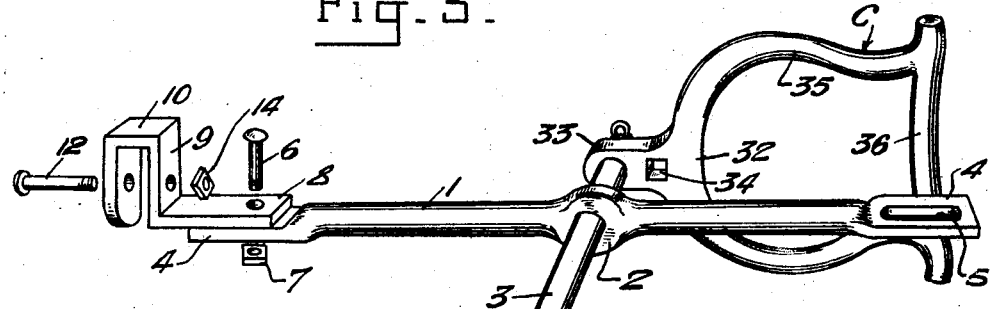
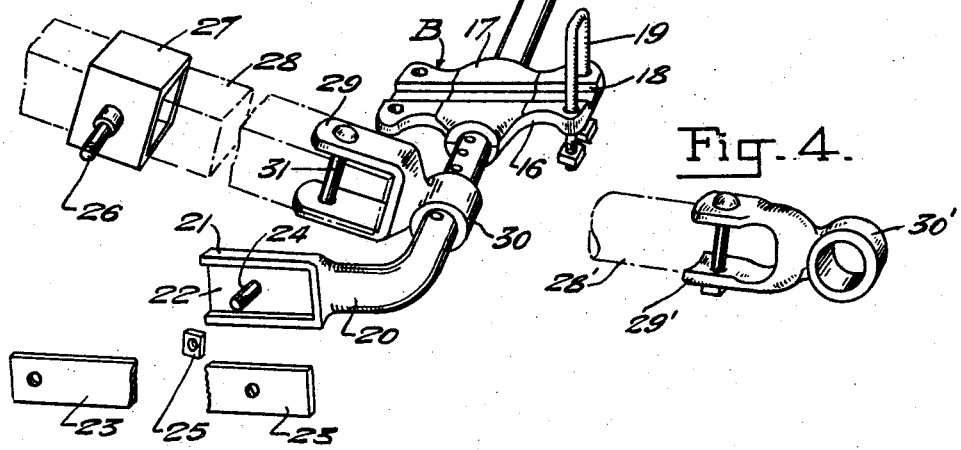
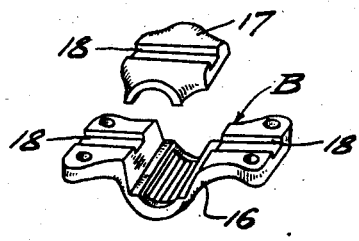
Inventor
L. P. Lewis
W. Morgenthaler
By Watson E. Coleman.
Attorney Patented July 5, 1927.

1,635,089

UNITED STATES PATENT OFFICE.

LEE P. LEWIS AND WILLIAM MORGENTHALER, OF HALLSVILLE, MISSOURI.

MARKER.

Application filed March 4, 1926. Serial No. 92,335.

This invention relates to certain improvements in markers and has relation more particularly to a device of this kind especially designed and adapted for use in connection with corn planters and the like, and it is an object of the invention to provide means whereby the marker may be readily engaged with the frame of the planter in such position to be readily operated by the occupant of the seat.

Another object of the invention is to provide a device of this kind wherein the marker arm is effectively supported for swinging movement from one side to the other of the frame.

The invention consists in the details of construction and in the combination and arrangement of the several parts of our improved marker whereby certain important advantages are attained and the device rendered simpler, less expensive and otherwise more convenient and advantageous for use, as will be hereinafter more fully set forth.

The novel features of our invention will hereinafter be definitely claimed.

In order that our invention may be the better understood, we will now proceed to describe the same with reference to the accompanying drawings, wherein:—

Figure 1 is a fragmentary view in top plan of the rear portion of a corn planter illustrating a marker constructed in accordance with an embodiment of our invention applied thereto;

Figure 2 is a view partly in section and partly in elevation of our improved marker as herein disclosed;

Figure 3 is a view in perspective of the marker as herein disclosed unapplied with certain of the parts separated;

Figure 4 is a view in perspective illustrating a modified form of bar sleeve;

Figure 5 is a view in perspective unapplied of a journal box herein disclosed for supporting the shaft.

As disclosed in the accompanying drawings, F denotes the rear portion of the frame of a planter and disposed transversely of said frame is a truss bar 1 provided substantially midway its ends with a bearing 2 for the inner end portion of the shaft 3. The shaft 3 is extended lengthwise of the frame F at the rear thereof and extends a predetermined distance beyond such rear for a purpose to be hereinafter referred to.

The extremities of the bar 1 are flattened, as at 4, and each of said flattened portions is provided with a solt 5 extending lengthwise of the bar 1 and through which is directed a bolt 6 having a coacting nut 7. This bolt 6 is also disposed through an outstanding foot 8 resting upon the flattened portion 4 and extending laterally from the free end portion of a side arm 9 of a hook member or bracket 10. The hook member or bracket 10 is substantially in the form of an inverted U and is adapted to straddle from above the side member 11 of the frame F whereby the bar 1 is maintained in desired applied position. The side arms 9 of the hook or bracket 10 are adapted to have disposed therethrough the bolt 12 also adapted to extend through the adjacent side member 11 of the frame F and thereby providing a positive attachment for the hook member or bracket. The bolt 12, when applied, has associated therewith a conventional nut 14.

The slots 5 in the opposite end portions of the bar 1 provide means whereby each of the hook members or brackets 10 may be extended or retracted with respect to the bar 1 in order to permit said bar to be readily adjusted for use in connection with frames of varying widths.

Underlying the central portion of the rear member 15 of the frame F is a bearing box B comprising the main portion 16 and a separable cap 17. The upper surfaces of the main portion 16 and the cap 17 are provided, when the same are in assembled relation, with the registering grooves or channels 18 extending lengthwise thereof and which receive the lower marginal portion of the end member 15 of the frame whereby said parts of the bearing box are effectively maintained in assembled relation. The bearing box is positively held in applied position with respect to the end member 15 by the U-clamps 19 of a conventional type which coact as is well known with the end member 15.

The bearing box B provides a mounting for the outer end portion of the shaft 3, said shaft however extending beyond said bearing box and terminating in a rock arm 20 substantially at right angles thereto. This rock arm 20 has its free end portion enlarged with a vertically disposed flattened face 21. This flattened face 21 is formed with a groove or channel 22 open at the outer end of the arm 20 and which receives an end portion of an elongated bar brace 23, said end portion of the bar brace 23 being held to the arm 20 by the bolt 24 and coacting nut 25. The outer end portion of the bar brace 23 is secured by the bolt 26 to a loop or sleeve 27 surrounding the marker arm or bar 28 at a desired point intermediate the ends thereof. The inner end portion of the bar or arm 28 is received between the outstanding arms 29 carried by the collar or sleeve 30 mounted upon the extended portion of the shaft 3, said bar or arm 28 being affixed to the arms 29 by the bolt 31 or the like.

The shaft 3 is of a length to have its inner end portion terminate slightly in advance of the conventional seat S herein diagrammatically disclosed, and affixed to said inner end portion of the shaft 3 is a foot crank C. This crank C comprises a substantially U-shaped member having its intermediate or base portion 32 provided with an outstanding shank 33 adapted to be adjustably connected through the medium of the spaced openings 34 with the shaft 3. The outer end portions of the side arms 35 of the foot crank C are connected by the cross member 36 extending outwardly beyond the side arms 35, each end of said cross member 36, according to the position of the foot crank, being adapted to be engaged by the foot of the operator to rock the shaft 3 to throw the arm or bar 28 from one side of the frame F to the other as desired.

In Figure 4 the collar or sleeve 30' is provided with the outstanding arms 29' of such cross sectional configuration to readily receive therebetween an extremity of a rounded or cylindrical marker arm or bar as indicated at 28' by broken lines.

From the foregoing description it is thought to be obvious that a marker constructed in accordance with our invention is particularly well adapted for use by reason of the convenience and facility with which it may be assembled and operated, and it will also be obvious that our invention is susceptible of some change and modification without departing from the principles and spirit thereof and for this reason we do not wish to be understood as limiting ourselves to the precise arrangement and formation of the several parts herein shown in carrying out our invention in practice except as hereinafter claimed.

We claim:—

1. In combination with the side members and an end member of a planter frame, a bar, hook members engageable with the side members of the frame, means for adjustably connecting the hook members with the end portions of the bar, said bar intermediate its ends being provided with a bearing, a bearing box, means for securing the bearing box to the end member of the planter frame, a shaft rotatably supported by the bearing of the bar and the bearing box, the outer end of the shaft extending beyond the end member of the frame, said extended portion being provided with a rock arm, a marker arm operatively engaged with the extended portion of the shaft and the rock arm, and a foot crank carried by the inner portion of the shaft.

2. In combination with the side members and an end member of a planter frame, a bar, hook members engageable with the side members of the frame, means for adjustably connecting the hook members with the end portions of the bar, said bar intermediate its ends being provided with a bearing, a bearing box, means for securing the bearing box to the end member of the planter frame, a shaft rotatably supported by the bearing of the bar and the bearing box, the outer end of the shaft extending beyond the end member of the frame, said extended portion being provided with a rock arm, a collar mounted on the extended portion of the shaft, a marker arm, means for connecting an end portion of said marker arm to the collar, a bar brace, means for securing one end portion of the bar brace to the rock arm, and means for securing the opposite end portion of the bar brace to the marker arm.

3. In combination with the side members and an end member of a planter frame, a bar, hook members engageable with the side members of the frame, means for adjustably connecting the hook members with the end portions of the bar, said bar intermediate its ends being provided with a bearing, a box, means for securing the box to the end member of the planter frame, a shaft rotatably supported by the bearing of the bar and the box, the outer end of the shaft extending beyond the end member of the frame, said extended portion being provided with a rock arm, a collar mounted on the extended portion of the shaft, a marker arm, means for connecting an end portion of said marker arm to the collar, a bar brace, a face of the rock arm being provided with a channel, an end portion of the bar brace fitting within said channel, means for securing said end portion of the bar brace to the rock arm, and means for attaching the opposite end portion of the bar brace to the marker arm.

4. In combination with the side members and an end member of the planter frame, a bar, hook members engageable with the side members of the frame, means for adjustably connecting the hook members with the end portions of the bar, said bar intermediate its ends being provided with a bearing, a bearing box, means for securing the bearing box to the end member of the planter frame, a shaft rotatably supported by the bearing of the bar and the bearing box, the outer end of the shaft extending beyond the end member of the frame, said extended portion being provided with a rock arm, a marker arm operatively engaged with the extended portion of the shaft and the rock arm, and a foot crank carried by the inner portion of the shaft, said box underlying the end member of the planter frame and provided across its top with a groove into which said end member of the frame is received.

In testimony whereof we hereunto affix our signatures.

LEE P. LEWIS.
WILLIAM MORGENTHALER.